US006771322B1

(12) United States Patent
Neifer

(10) Patent No.: US 6,771,322 B1
(45) Date of Patent: Aug. 3, 2004

(54) INTERFACE DEVICE BETWEEN A SEMICONDUCTOR STORAGE MEDIUM FOR MULTIMEDIA AND A STANDARD VIDEO TERMINAL

(75) Inventor: Wolfgang Neifer, Freising (DE)

(73) Assignee: SCM Microsystems GmbH, Ismaning (DE)

( * ) Notice: Subject to any disclaimer, the term of this patent is extended or adjusted under 35 U.S.C. 154(b) by 0 days.

(21) Appl. No.: 09/647,945

(22) PCT Filed: Mar. 19, 1999

(86) PCT No.: PCT/EP99/01851

§ 371 (c)(1),
(2), (4) Date: Jan. 5, 2001

(87) PCT Pub. No.: WO99/48284

PCT Pub. Date: Sep. 23, 1999

(30) Foreign Application Priority Data

Mar. 19, 1998 (DE) ..................................... 298 05 046 U

(51) Int. Cl.[7] .............................................. H04N 9/64
(52) U.S. Cl. ...................... 348/719; 725/140; 725/152
(58) Field of Search ................................ 348/552, 589, 348/600, 734, 553, 714, 719–721; 725/139–142, 131–134, 151–153; 710/305, 307, 313, 62

(56) References Cited

U.S. PATENT DOCUMENTS

| 5,483,296 | A | | 1/1996 | Nonweiler |
| 5,509,073 | A | | 4/1996 | Monnin |
| 5,748,913 | A | | 5/1998 | Shibahara |
| 5,909,559 | A | * | 6/1999 | So .............................. 395/307 |
| 6,052,556 | A | * | 4/2000 | Sampsell ..................... 455/6.2 |
| 6,081,533 | A | * | 6/2000 | Laubach et al. ............ 370/421 |
| 6,154,600 | A | * | 11/2000 | Newman et al. .............. 386/4 |
| 6,401,205 | B1 | * | 6/2002 | Rallis et al. ................. 713/172 |
| 6,421,235 | B2 | * | 7/2002 | Ditzik ......................... 361/683 |

FOREIGN PATENT DOCUMENTS

| DE | G 94 17 937.9 | 4/1995 |
| DE | 0 681 397 A2 | 5/1995 |
| DE | 0 681 397 | 11/1995 |
| DE | 0 763 939 | 3/1997 |
| DE | 195 34 450 A1 | 3/1997 |
| DE | R1 80 528.2 | 9/1998 |
| DE | PCT/EP 99/01851 | 3/1999 |
| EP | 0 704 813 A2 | 9/1995 |
| EP | 0 726 675 A1 | 1/1996 |
| EP | 0 790 733 A2 | 2/1997 |
| JP | 7-162784 | 6/1995 |
| KR | 97-17194 | 4/1997 |

OTHER PUBLICATIONS

"Digitale Fotos mit einem Chi,", Halbleiter, Elektronik 14/1997 (p. 14).

(List continued on next page.)

Primary Examiner—Victor R. Kostak
(74) Attorney, Agent, or Firm—Finnegan, Henderson, Farabow, Garrett & Dunner, L.L.P.

(57) ABSTRACT

The interface device between a semiconductor storage medium (18) for multimedia contents and a television standard video port comprises a PCMCIA slot (14) and a card reader (16) in a PCMCIA card format which is connectable therewith. A video graphics control unit (42) is connected to a video overlay interface (40) arranged between the PCMCIA slot (14) and the graphics control unit. A RAM memory (44) is allocated to the video graphics control unit (42). A digital-to-analog encoder (50) is arranged between an output of the video graphics control unit (42) and the SCART format television standard video port. The card reader is configured for the particular data format of the semiconductor storage medium (18) and transfers the data read out of the semiconductor storage medium (18) to the video overlay interface (40) in a data format suitable for the latter.

21 Claims, 3 Drawing Sheets

OTHER PUBLICATIONS

"Single–Chip erledigt Multimedia", Bachstein,Zerhusen, Elektronik 17/1996 (pps.58–62).

"Hard–und Software der Set–Top–Boxen", Engelkmp, RFE Aug. 1996 (pps.20–23).

"Softwarearchitekturen für interaktive digitale Decoder", Hartwig, Fernseh–Und Kino–Technik 50, Nr. Mar. 1996 (pps.92–102).

"Personal Media using Personal Computer Memory Card International Association Cards", IBM Technical Disclosure Bulletin, vol. 38, No. 9 Sep. 1995 (p. 489).

"PC Card Standard and its Future Trends", Adachi, Joho Shori, vol. 37, No. 12 (pps. 1098–1104) Dec. 1996.

* cited by examiner

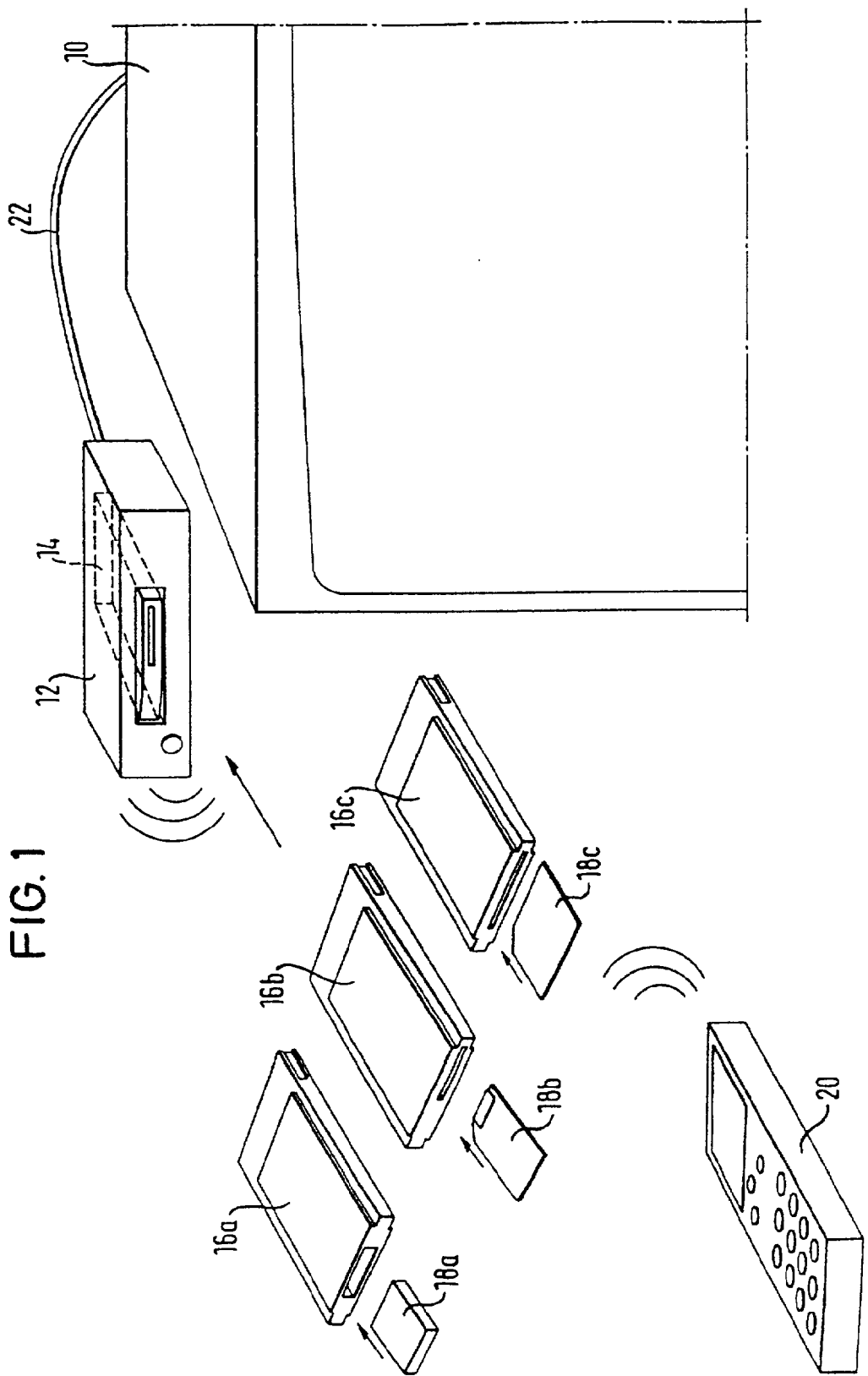

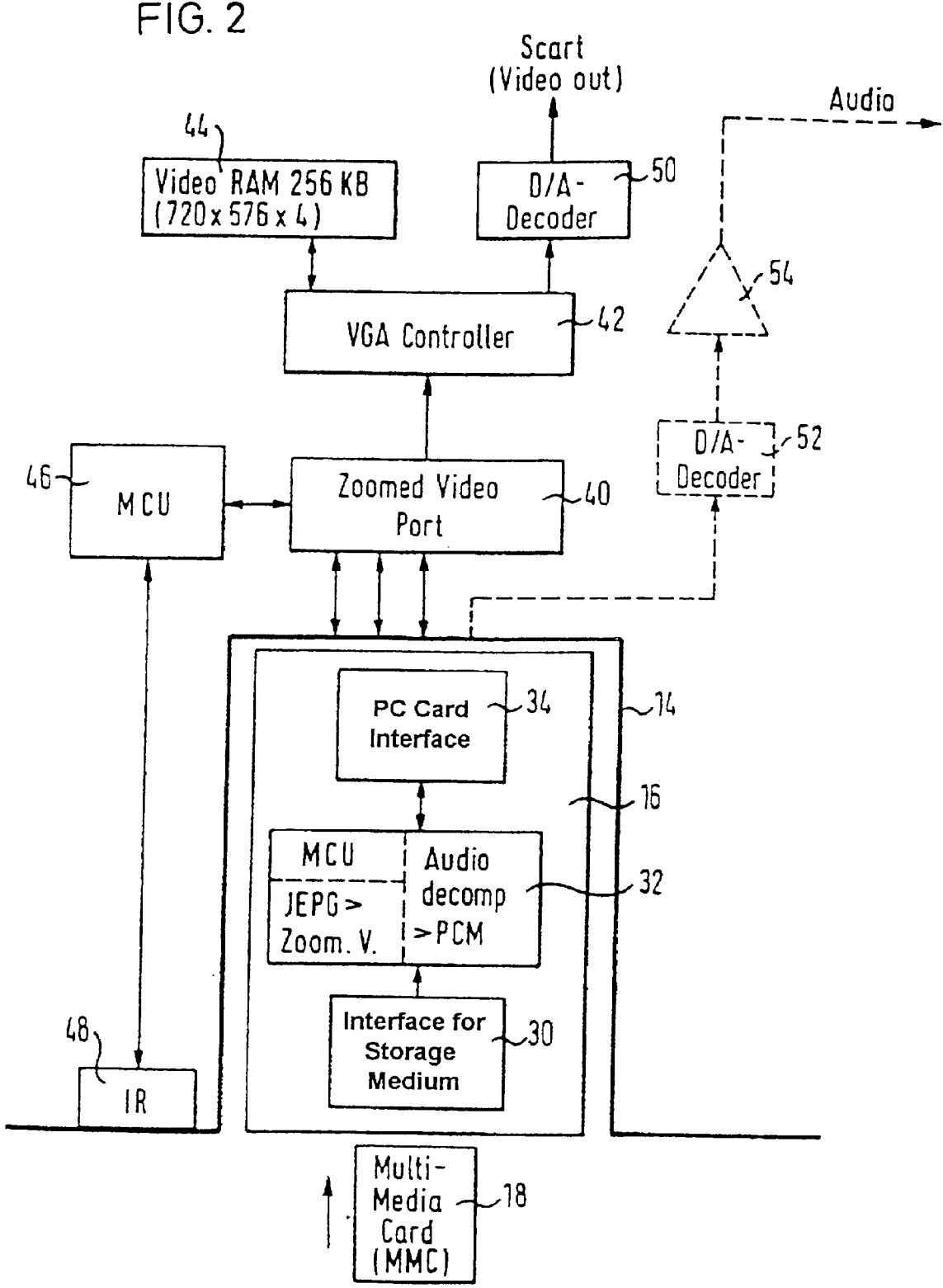

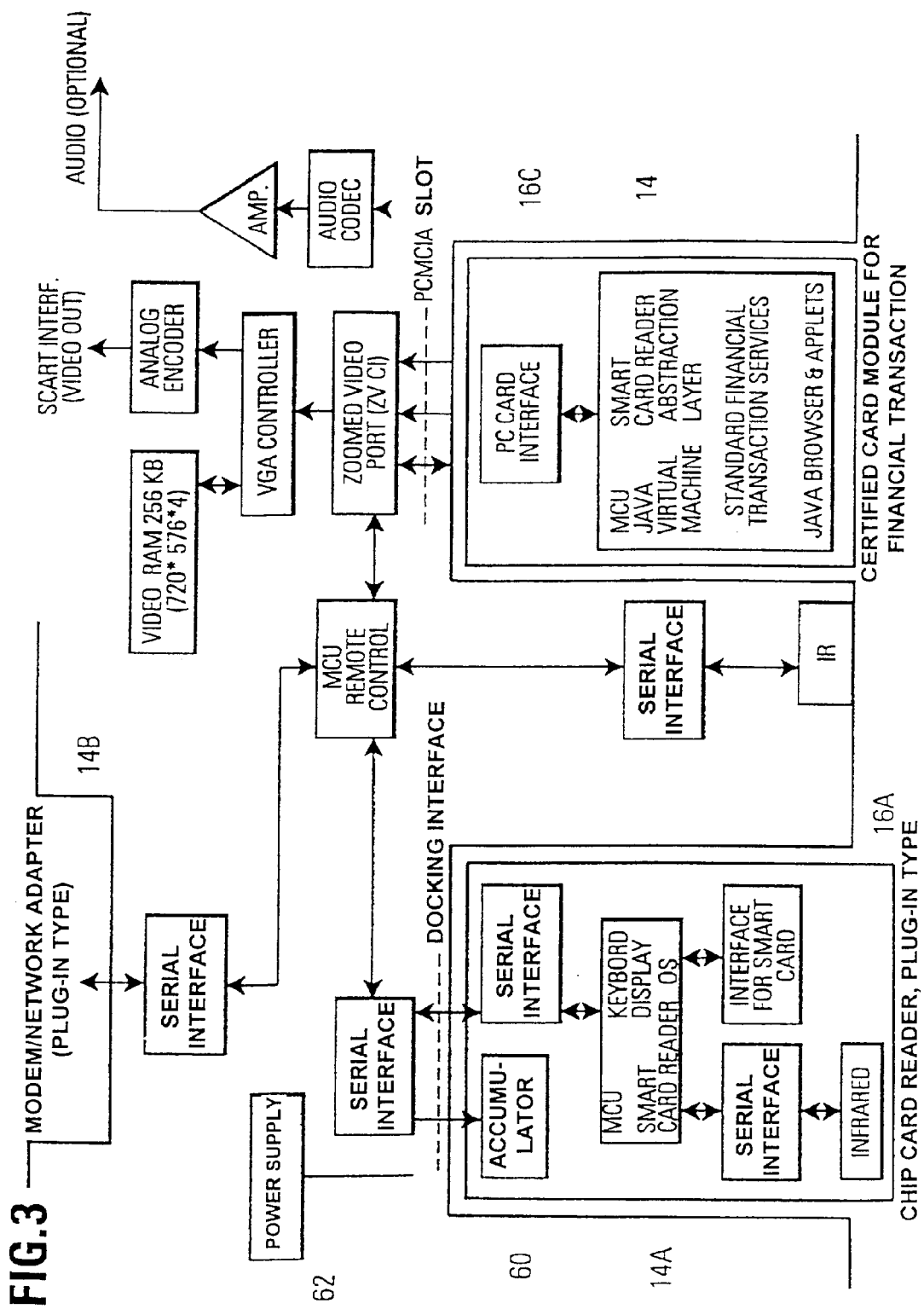

INTERFACE DEVICE BETWEEN A SEMICONDUCTOR STORAGE MEDIUM FOR MULTIMEDIA AND A STANDARD VIDEO TERMINAL

The invention relates to an interface device between a storage medium for multimedia contents and a television standard video port.

Semiconductor storage media for multimedia contents are increasingly gaining ground. One example is memory cards for digital image data recorded by digital cameras. The rapid advances achieved in semiconductor storage technology render it possible to also store video contents on semiconductor storage modules. Depending on the purpose of use and on the manufacturer, turer, there exist different standards for semiconductor storage modules, which differ in regard to the outer form and also in regard to the data format and contact assignment. Therefore, adapters are required for an access to the stored data. Such adapters usually present an interface with a data processing apparatus of the PC standard. Accordingly, multimedia contents stored on semiconductor storage modules can be accessed only in a PC environment.

The invention makes it possible for multimedia contents stored on semiconductor storage media to be accessible also in a usual video environment, in particular in a television environment. This is achieved by an interface device comprising the following components:

(a) at least one PCMCIA slot;
(b) at least one card reader in a PCMCIA card format;
(c) a video graphics control unit;
(d) a video overlay interface between the PCMCIA slot and the graphics control unit;
(e) a RAM memory allocated to the video graphics control unit;
(f) a digital-to-analog encoder between an output of the video graphics control unit and the television standard video port. The card reader is configured for the particular data format of the storage medium. The data read out of the storage medium is transferred to the video overlay interface in a data format suitable for the latter.

A widely used video interface is that of the SCART type. It is found both on television sets and on video recording and reproduction apparatus. The interface device in accordance with the invention permits a direct use of common television and video apparatus for the reproduction of multimedia contents stored on semiconductor storage media. The adaptation to the different form factors and data formats of the commonly used semiconductor storage media is performed by means of the card reader which for its part is configured as a PCMCIA card. The data edited by the card reader and passed on to the video overlay interface has the data format expected by this interface, regardless of the type of the particular semiconductor storage medium, with the result that semiconductor storage media of any type and format can be read out without any change in the interface device. Future developments are also taken into account since it is merely the card reader which has to meet the requirements of a new type of medium.

A big advantage of a multimedia system comprising the interface device according to the invention is the inherent copy protection. The data stored in the semiconductor storage medium is decoded in the card reader, in particular expanded, and is not accessible from outside. The analog video signal available at the standard video port is unusable for copying purposes since a distribution makes sense only in the usual encoded data formats.

Further advantages and features of the invention will be appreciated from the dependent claims and from the following description with the aid of the accompanying drawings in which:

FIG. 1 diagrammatically shows a multimedia system with an interface device in accordance with the invention;

FIG. 2 shows a block diagram of the interface device; and

FIG. 3 shows a block diagram of an expanded embodiment.

The multimedia system illustrated diagrammatically in FIG. 1 comprises a conventional television set 10 and an interface device 12, which in the embodiment shown has a casing of its own. The interface device 12 is equipped with a slot 14 for a card reader in the format of a PCMCIA card. In FIG. 1 three such card readers 16a, 16b, 16c are illustrated. Each card reader 16a, 16b and 16c is configured for a particular type of semiconductor storage medium. FIG. 1 shows three different semiconductor storage modules 18a, 18b and 18c, which may differ from each other as regards the dimensions, data format and contact assignment. Each card reader has an insertion slot matching the associated semiconductor storage medium. A further component of the system is an infrared remote control with a portable handheld set 20. The interface device 12 is connected to the television set 10, preferably to a SCART port of the television set, via a cable 22.

FIG. 2 diagrammatically shows the most important functional elements of the interface device and of a card reader inserted into it. Inserted in the slot 14 of the interface device is a card reader 16 which is adapted to accommodate a semiconductor storage module 18. In the illustrated example the storage module is of the MMC (multimedia card) type. The card reader 16 is specifically designed for accommodating such a storage medium and for decoding the data stored therein. For this purpose it is provided with an interface 30 which transfers the data read out of the storage module 18 to a control unit 32. This control unit 32 includes a microprocessor of its own for sequence control and a complete decoding electronics which expands the compressed data supplied and converts it to a format suitable for further processing in the interface device. The card reader is further provided with a PC card interface 34 which ensures a uniform connection and data format for the interface device, irrespective of the particular type of storage medium.

On its input side the interface device comprises a video overlay interface 40, preferably of the "zoomed video port" type. This interface 40 converts the data stream received into a signal which may be further processed by a video graphics control unit 42 (VGA controller) in accordance with the PC standard. For intermediate storage of the video data a RAM memory 44 is provided in the usual manner. The size of this memory is made dependent on the intended resolution and depth of color. In the example shown in FIG. 2 the resolution is 720 times 576 pixels, with a depth of color of 4 bits. These are the minimum requirements for multimedia video contents. The interface device further comprises a microprocessor control unit 46 for sequence control and operation. An infrared interface 48 is provided for the communication with the portable hand-held set 20.

On its output side the interface device is provided with a digital-to-analog decoder 50 which converts the digital video signals supplied by the graphics control unit 42 into an analog output signal and transfers it to a SCART port. Optionally, an analog audio output is provided which, by means of a digital-to-analog decoder 52 and a buffer amplifier 54 connected downstream, is derived directly from the data supplied by the card reader 16.

In addition to the decoding or expansion of the data read out of the storage medium, the card reader 16 may perform a decryption if the data is stored in encrypted form. In addition or as an alternative a user authorization check may be carried out in the card reader 16 by means of a SAM module or the like. By these measures illegal copies are effectively prevented from being produced.

The slot 14 need not be restricted to a particular data format. Rather, in the preferred embodiment there is the provision that this slot is capable of being changed over between different standard formats. More particularly, these are the following standard formats:

video port common interface 1394 interface

USB.

The PCMCIA slot technology allows a variable assignment of the 68 contacts. In addition, a PCMCIA slot has the capability to recognize the format of an inserted PC card and to adapt the contact assignment to the data format recognized.

In a further development of the invention there is the provision that the card reader 16 connectable to the slot 14 has for its part an interface for connecting an external data channel. The card reader 16 is coupled with the external data channel in a wireless way via a radio or infrared connection, for example, or via a plug connection arranged on a narrow side of the PC card. The slot for the external data channel may in turn have any one of the following standard formats:

video port common interface 1394 interface

USB.

The contact assignment of the card reader 16 is switched over on the side of the slot 14 depending on the particular data format.

In the expanded embodiment of the interface device as shown in FIG. 3, an additional PCMCIA slot 14A is provided. A chip card reader 16A, which is configured as a PC card, may be connected to this slot 14A. This chip card reader 16A is provided with an accumulator 60 allowing a stand-alone operation outside of the interface device. This accumulator 60 is charged by a power supply unit 62 arranged in the interface device. In the preferred embodiment there is the provision that the chip card reader 16A is connected to a remote control unit, when required, which is coupled with the interface device, preferably via a bidirectional infrared transmission route. By means of a chip card (smart card) adapted to be read out by the chip card reader 16A and by means of the controls of the remote control unit, the interface device can be used to perform safety-relevant functions and transactions, for instance for checking the authorization to read out a semiconductor storage medium located in the card reader 16.

In the embodiment illustrated in FIG. 3, further provided at the interface device is a further slot 14B to which a modem or a network adapter may be connected. This additional slot 14B and the plug-in type module connected thereto may be employed to access a remote network (e.g., Internet). In combination with the functions described above of the chip card reader 16A and of the remote control unit, it is also possible in this way to carry out safety-relevant functions and transactions via a remote network.

As can be further seen from FIG. 3, a certified card module 16C for financial transactions may optionally be connected to the slot 14. The combination with the chip card reader 16A allows complex identity and user authorization checks for financial transactions.

In all of the above-described functions the television set 10 is used as video output device, and conversion of the video data to the required format is done via the components shown in FIG. 2, especially via the interface 40 and the video graphics control unit 42.

What is claimed is:

1. An interface device between a semiconductor storage medium and a television standard video port, comprising:

at least one PCMCIA slot coupled to a video overlay interface, wherein the PCMCIA slot is configured to receive a card reader in a PCMCIA card format, the card reader is capable of receiving the semiconductor storage medium in multiple data formats and converting data stored in the semiconductor storage medium into a format compatible with the video overlay interface, and wherein the video overlay interface is configured to process the converted data from the card reader into one or more video signals;

a video graphics control unit to receive the one or more signals from the video overlay interface and to provide video data based on the received signals, wherein the video overlay interface is coupled between the video graphics control unit and the PCMCIA slot;

a RAM memory allocated to the video graphics control unit; and a digital-to-analog decoder to output an analog signal derived from the video data provided from the video graphics control unit to the television standard video port;

and wherein the PCMCIA slot is adapted to be switched over between at least two of the following standard formats: video port format, common interface format, 1394 interface format, and USB format.

2. The interface device according to claim 1, wherein the card reader includes means for decrypting data stored in the semiconductor storage medium.

3. The interface device according to claim 1, wherein the card reader includes a conditional access module.

4. The interface device according to claim 1, wherein the card reader includes an interface for connection to an external data channel for any of the following standard formats: video port format, common interface format, 1394 interface format, and USB format.

5. The interface device according to claim 4, wherein the card reader includes an infrared transceiver for connection to the data channel.

6. The interface device according to claim 1, further comprising:

a high-speed modem to feed data from the semiconductor storage medium to a remote network.

7. The interface device according to claim 1, further comprising:

a network adapter to feed data from the semiconductor storage medium to a remote network.

8. An interface device between a semiconductor storage medium and a television standard video port, comprising:

a first PCMCIA slot;

a media card reader in a PCMCIA card format;

a video graphics control unit;

a video overlay interface coupled between the PCMCIA slot and the graphics control unit, the video overlay interface associated with a predetermined data format;

a RAM memory associated with the video graphics control unit;

a digital-to-analog decoder coupled between the video graphics control unit and the television standard video port;

a second PCMCIA slot; and a chip card reader;

wherein the media card reader is configured for a particular data format associated with the semiconductor storage medium and for converting data from the semiconductor storage medium to the predetermined data format of the video overlay interface;

and wherein the chip card reader includes an accumulator chargeable by the interface device for stand-alone operation outside of the interface device.

9. The interface device according to claim 8, wherein the chip card reader is further configured for insertion into a remote control unit.

10. The interface device according to claim 9, wherein the remote control unit is coupled with the interface device via a bi-directional wireless transmission channel.

11. An interface device between a semiconductor storage medium and a television standard video port, the interface device comprising:

at least one PCMCIA slot coupled to a video overlay interface, wherein the PCMCIA slot is configured to receive a card reader in a PCMCIA card format, the card reader is capable of receiving the semiconductor storage medium in multiple data formats and converting data stored in the semiconductor storage medium into a format compatible with the video overlay interface, and wherein the video overlay interface is configured to process the converted data from the card reader into one or more video signals;

a video graphics control unit to receive the one or more signals from the video overlay interface and to provide video data based on the received signals, wherein the video overlay interface is coupled between the video graphics control unit and the PCMCIA slot;

a RAM memory allocated to the video graphics control unit; and a digital-to-analog decoder to output an analog signal derived from the video data provided from the video graphics control unit to the television standard video port.

12. The interface device according to claim 11, wherein the card reader includes means for decrypting data stored in the semiconductor storage medium.

13. The interface device according to claim 11, wherein the card reader includes means for carrying out a user authorization check.

14. The interface device according to claim 11, wherein the PCMCIA slot is adapted to be changed over between at least two of the following standard formats; video port format, common interface format, 1394 interface format, and USB format.

15. The interface device according to claim 14, wherein the card reader includes an interface for connecting an external data channel for any one of the following standard formats: video port format, common interface format, 1394 interface format, and USB format.

16. The interface device according to claim 15, wherein the card reader includes an infrared receiver coupled with the external data channel.

17. The interface device according to claim 11, further comprising:

a high-speed modem for transferring data from the semiconductor storage medium to a remote network.

18. The interface device according to claim 11, further comprising:

a network adapter for transferring data from the semiconductor storage medium to a remote network.

19. An interface device between a semiconductor storage medium and a television standard video port, the interface device comprising:

at least one PCMCIA slot coupled to a video overlay interface, wherein the PCMCIA slot is configured to receive a card reader in a PCMCIA card format, the card reader is capable of receiving the semiconductor storage medium in multiple data formats and converting data stored in the semiconductor storage medium into a format compatible with the video overlay interface, and wherein the video overlay interface is configured to process the converted data from the card reader into one or more video signals;

a video graphics control unit to receive the one or more signals from the video overlay interface and to provide video data based on the received signals, wherein the video overlay interface is coupled between the video graphics control unit and the PCMCIA slot;

a RAM memory allocated to the video graphics control unit; and a digital-to-analog decoder to output an analog signal derived from the video data provided from the video graphics control unit to the television standard video port; and a second PCMCIA slot and a chip card reader, the chip card reader includes an accumulator chargeable by the interface device for a stand-alone operation outside said interface device.

20. The interface device according to claim 19, wherein the chip card reader is connected to a remote control unit.

21. The interface device according to claim 20, wherein the remote control unit is coupled to the interface device via a bi-directional infrared interface.

* * * * *